April 6, 1954  H. RUDOLPH ET AL  2,674,653
METHOD OF AND APPARATUS FOR SELECTIVELY RECEIVING
FREQUENCY-KEYED TELEGRAPHIC SIGNALS
Filed March 7, 1952  5 Sheets-Sheet 1

Inventors,
Hans Rudolph,
Heinz Jürgens, &,
Walter Reger.
By
Atty.

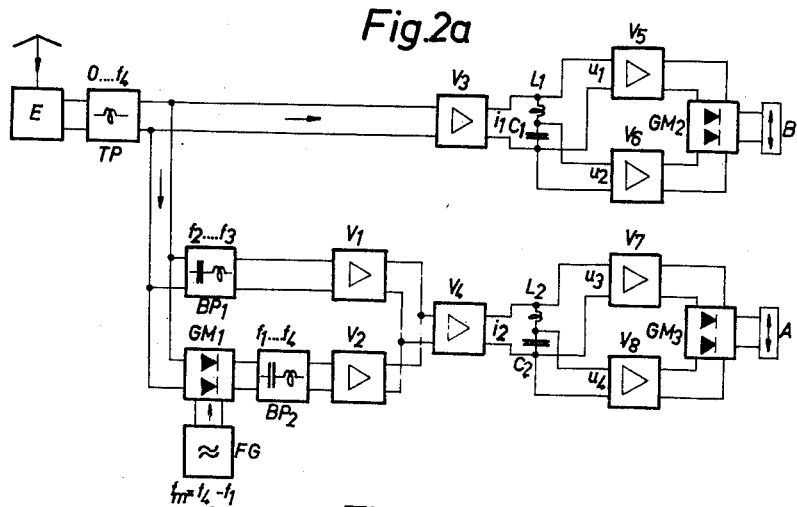
Fig.2a
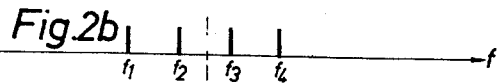
Fig.2b
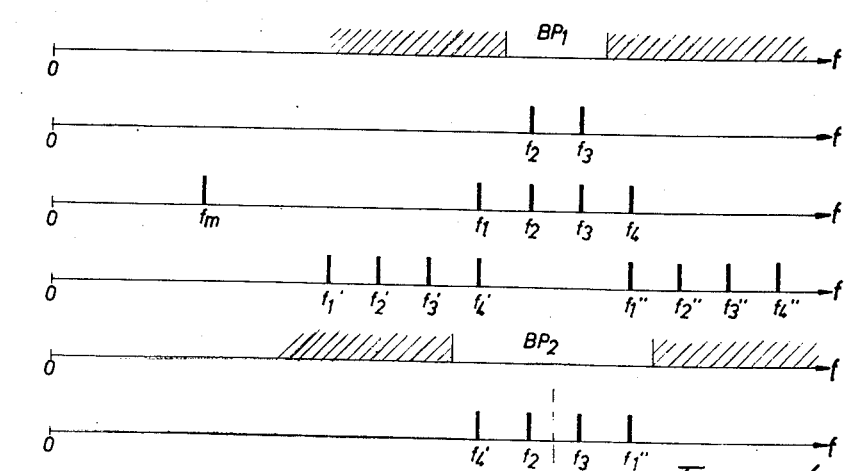

Patented Apr. 6, 1954

2,674,653

UNITED STATES PATENT OFFICE 2,674,653

METHOD OF AND APPARATUS FOR SELECTIVELY RECEIVING FREQUENCY-KEYED TELEGRAPHIC SIGNALS

Hans Rudolph, Munich-Solln, Heinz Jürgens, Munich, and Walter Reger, Munich-Solln, Germany, assignors to Siemens & Halske Aktiengesellschaft, Munich, Germany, a corporation of Germany Application March 7, 1952, Serial No. 275,358

Claims priority, application Germany March 14, 1951

11 Claims. (Cl. 178—61)

This invention is concerned with a method of and apparatus for selectively receiving signals formed by alternate space and mark current conditions which are superposed by carrier frequency-keying in accordance with the frequency variation procedure in short wave telegraphy.

In such procedure the space and mark current conditions of one signal are formed by frequency-keying of a carrier with a frequency variation of a certain magnitude, and the corresponding current conditions of the other signal are formed by frequency-keying of the same carrier with a frequency variation of double magnitude. Three frequency steps therefore will result upon superposing the two signals depending on the space or mark current conditions of each individual signal; i. e., the carrier frequency alternates between four values which are equally spaced one from the other and of which only one is present at any one time. The advantage of this keying procedure is that the wireless transmitter always operates with full capacity so that transmission takes place with the highest possible economic efficiency.

The receiver apparatus for the above indicated transmission procedure must be constructed so as to filter the two signals which had been superposed during the transmission, as well as the two space and mark current conditions within each signal channel, and to convert the latter into suitable operating conditions, e. g., into direct currents.

It is known to shift the four alternately occurring signal frequencies by intermediate frequency modulation into a low frequency range, to separate them within such range by filtering, to rectify the resulting currents and to conduct the rectified currents in proper grouping to the receiver relays of the two signal channels. The known apparatus for selectively receiving the signals requires a considerable expenditure for equipment, due to the great number and quality of the filters required for proper operation.

The object of the invention is to reduce the expenditure for receiving the signals transmitted by the procedure explained before.

This object is realized by filtering the four alternately occurring signal frequencies, preferably in the low frequency position, in two receiver paths or branches which are respectively associated with the two signal channels, the filtering being accomplished by frequency-dependent phase shifting and phase demodulation to place the four frequencies in different pairs, one pair for each of the two signal channels, and by converting the filtered pairs of frequencies into direct current space and mark signals for the associated signal channels.

One embodiment of the invention provides at least in one of the two receiver paths phase-shifting elements and phase demodulation means to convert each of the two signal frequencies of the upper pair of frequencies into direct currents which represent one condition of the corresponding signals (e. g., the space current condition) and to convert each of the two signal frequencies of the lower part into direct currents which represent a different condition (e. g., the mark current condition) of the same signals.

It is possible by the invention to convert, without the use of filters, at least one of the corresponding signals into direct currents which are suitable for recording.

There are, in accordance with the invention, several possibilities for the simultaneously recording of the other signals. There may be provided in the other receiver path an arrangement corresponding to that mentioned above, and such an arrangement may be connected with a switch which is adapted to exchange the relative positions either of the two median or of the two outer signal frequencies. The result of such frequency-switching is that the frequency succession which corresponds to the space and mark currents of the second signal will be the same as that of the first signal operating without frequency-shifting.

In another embodiment there may be provided means, for the signal recording in the second receiver path, adapted to conduct the four alternately occurring signal frequencies to a phase demodulator over phase-shift elements which produce for the four signal frequencies phase position differentials of the alternating voltages in the two input circuits of the demodulator, which increase or decrease from frequency to frequency always by 180°.

The various objects and features of the invention will appear from the detailed description which will presently be rendered with reference to the accompanying drawings. In these drawings, Figs. 1a–1e illustrate the superposing of the signals;

Fig. 2a is a block diagram of an embodiment of the invention in which the essential parts in the two receiver paths are similarly constructed;

Fig. 2b illustrates the operation of the circuit shown in Fig. 2a;

Figure 2C:
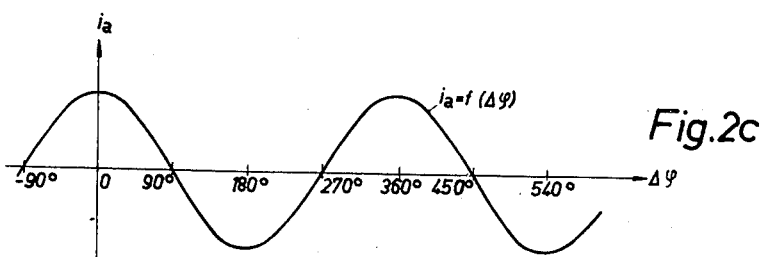
Fig. 2c shows the form of control current resulting in the operation of the invention.
Figure 3A:
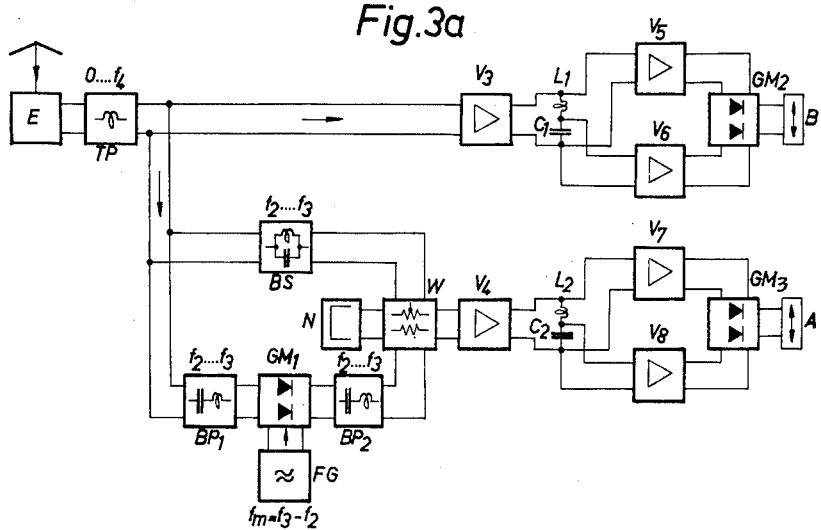
Figure 3B:
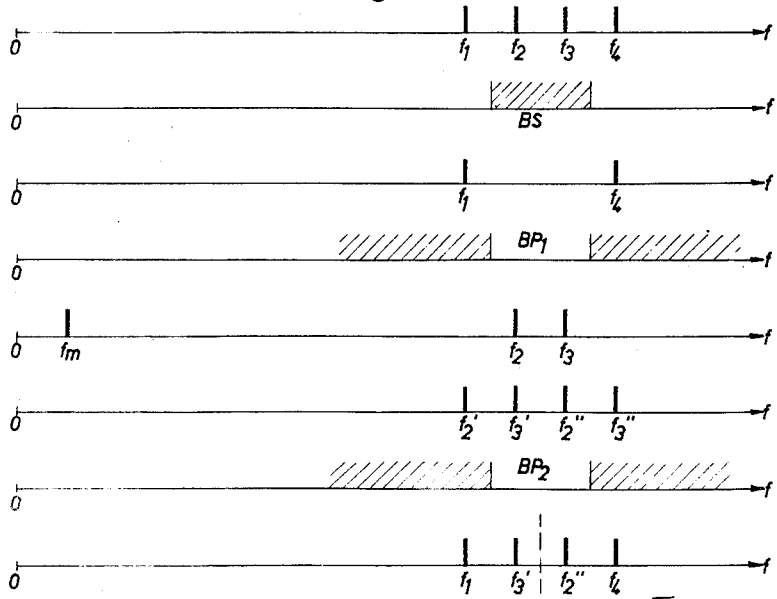
Figure 4A:
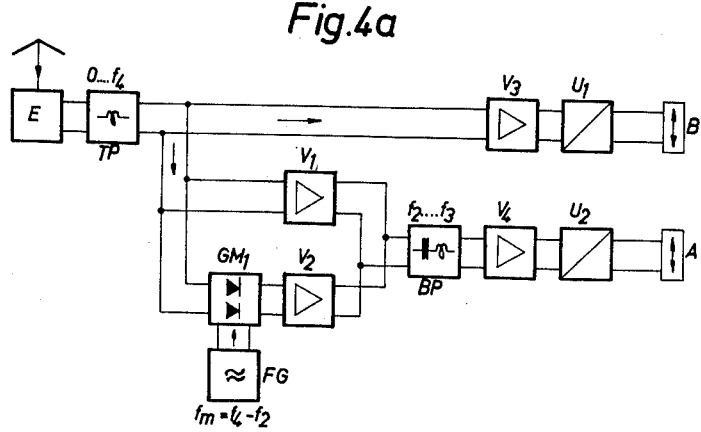
Figure 4B:
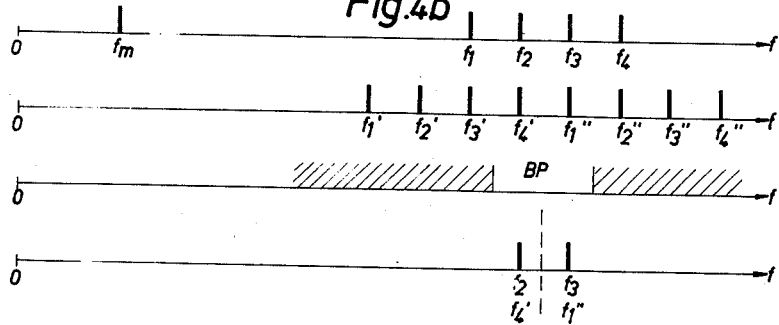
Figure 5A:
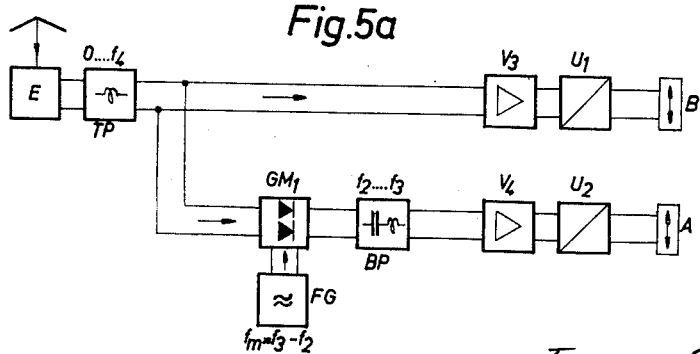
Figure 5B:
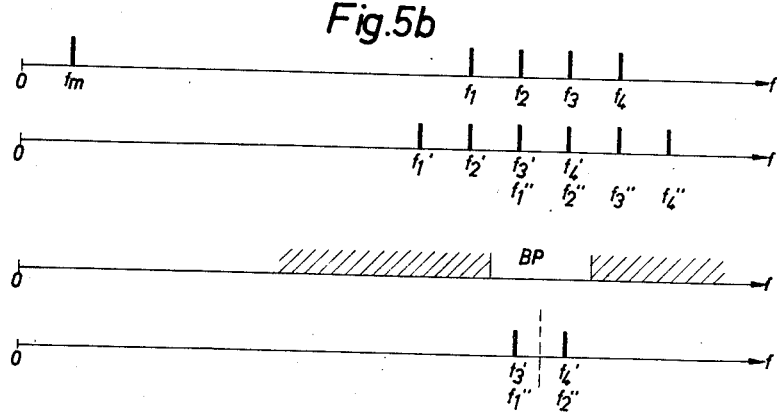

Figs. 3a, 4a and 5a indicate in block diagram form modifications of the circuit of Fig. 2a;

Figs. 3b, 4b and 5b illustrate the operation of the circuits shown in Figs. 3a, 4a and 5a.

Figure 6A:
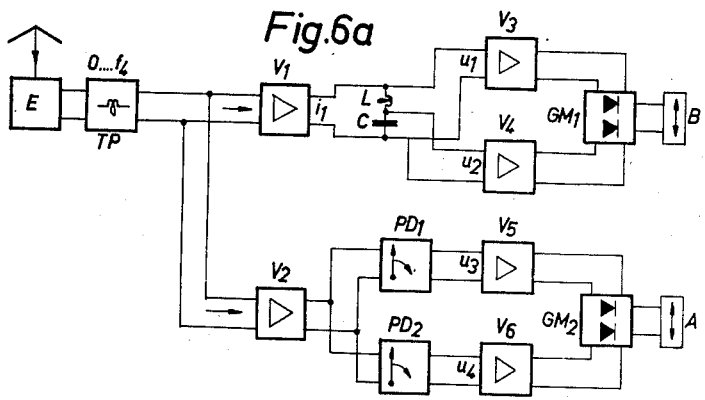
Figure 6B:
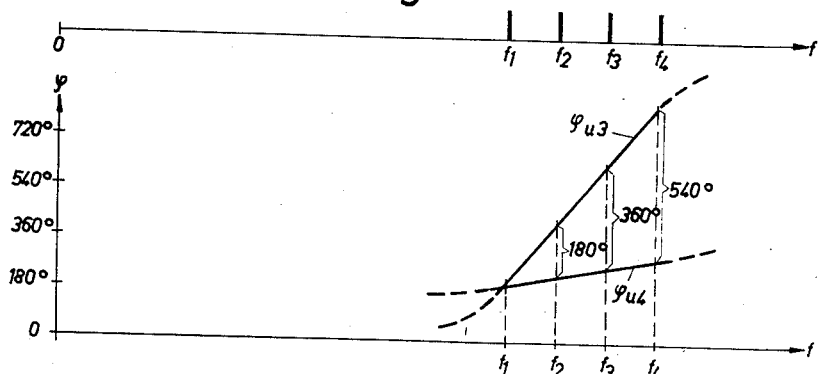

Fig. 6a is a block diagram of another form of the invention in which two different kinds of phase-shift means are used in the two receiver paths for the phase demodulation therein; and Fig. 6b shows in diagrammatic manner the operation of the circuit of Fig. 6a.

Figure 1A:

Referring now to Fig. 1a, this figure shows in diagrammatic manner the form of a signal A. The signal may be a double current signal from a telegraph transmitter, and comprises so-called space and marking current units of different duration. T designates the space current condition and Z the mark current condition.

Figure 1B:
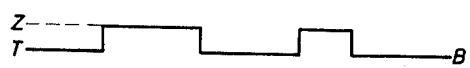

Another signal B is indicated in Fig. 1b. This signal may come from another transmitter and is transmitted simultaneously with the first signal A. It may likewise be a double current signal composed of direct currents of different directions.

Figure 1C:
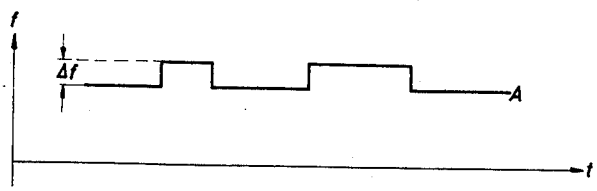

Fig. 1c shows the form of the signal A after the frequency-keying. The space current condition is reproduced by a certain frequency, and the mark current condition by a certain other, e. g., by a higher, frequency. These frequencies differ by the value $\Delta f$ which is the so-called frequency variation mentioned before.

Figure 1D:
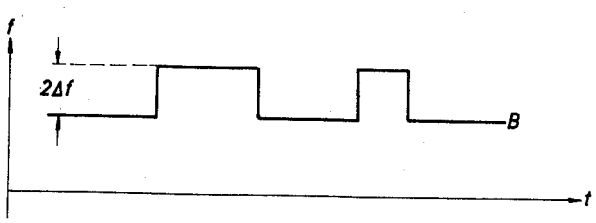

The other signal is by similar frequency-keying formed as shown in Fig. 1d, but with a frequency variation $2\Delta f$, which is twice that of signal A. It is again assumed that the space current condition is produced by a frequency which is lower than that for the mark current condition.

Figure 1E:
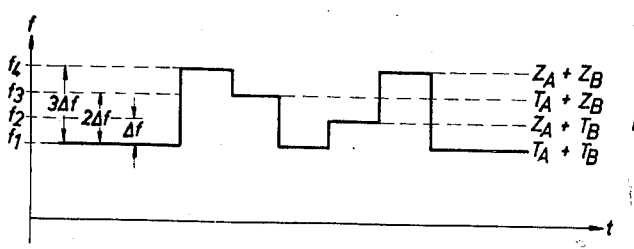

If the two signals indicated in Figs. 1c and 1d are now superposed incident to the frequency-keying in such a manner that simultaneously occurring frequency variations of the two signals become additive and, assuming for each signal the identical lower frequency, there will result the combined signal illustrated in Fig. 1e. It is assumed, for simplified representation, that the starts of the signal steps or units coincide, but it will of course be clear that this is not absolutely necessary.

The combined signal, as will be seen from Fig. 1e, is constructed of three steps, each individual step being equal to the value $\Delta f$. Accordingly, there are four different signal frequencies possible. However, these signal frequencies alternate in a succession determined by the two signals; e. g., they do not occur simultaneously. The lowest frequency is present if there is space current condition in both signal channels; the highest frequency is present if there is mark current condition in both channels. The frequency $f2$ corresponds to mark current condition in the channel A and also to simultaneous space current condition in the channel B. The frequency $f3$ is associated with the space current condition in the channel A and with the mark current condition in the channel B. The interrelationship may be tabulated as indicated below, the space current condition being indicated by T and the mark current condition by Z:

| Frequency | $f1$ | $f2$ | $f3$ | $f4$ |
|---|---|---|---|---|
| Channel A | T | Z | T | Z |
| Channel B | T | T | Z | Z |

These four alternately occurring signal frequencies may be separated at the receiver by filtering, the resulting currents may be rectified and the rectified currents may be combined in such a manner as to obtain the original current impulse succession for the two signals. As explained before, the known method for doing this requires considerable expenditures for filters. The object of the invention is to save filters, or, rather to say, to obtain a very considerable reduction of filter expenditure.

Fig. 2a shows an embodiment requiring only two band filters for predetermined pass frequencies.

E and Fig. 2a designates a wireless receiver for receiving signals and for transforming these signals into low-frequency signals in known manner by known single or multiple intermediate frequency modulation. The receiver may also comprise desired and known means for maintaining the frequency constant and frequency-supervising means as well as known and desired amplitude-limiting means. At the output of the receiver is preferably a low-pass frequency TP which passes all frequencies up to the highest of the four signal frequencies, but at least all of the four signal frequencies $f1$ to $f4$. This low-pass filter is at any rate a part of the receiver and, so far as a comparison analysis of the equipment expenditure is concerned, it may be disregarded. The same is true of the usual component parts of the wireless receiver E.

From the output of the low-pass filter TP extend two receiver paths which are respectively associated with the two signal channels. The received voltage, the frequency of which may at any instant correspond to one of the four values $f1$ to $f4$, is conducted to the amplifier V3 in the upper receiver path. The output from the amplifier V3 is fed to a series resonance circuit comprising an inductance L1 and a capacitance C1. The alternating current $i1$ at the output of the amplifier V3 causes voltage drops at the components of this resonance circuit. The phase position of these voltage drops is dependent on the frequency in a manner which will presently appear. The total voltage $u1$ is over an amplifier V5 conducted to one input of a double opposition modulator GM2. The partial voltage $u2$ tapped from the capacitance C1 is conducted to the other input of the modulator GM2 over the amplifier V6. The rectified currents appearing at the output of the modulator GM2, which have double current characteristics, are conducted to a suitable polarized relay B which serves for the further transmission or evaluation of the signals.

The diagram appearing at the top of Fig. 2b shows the low-frequency position of the four alternately occurring signals $f1$, $f2$, $f3$ and $f4$. Important is thereby the spacing between these signals, which in a practical embodiment amounts, e. g., to 400 cycles. The spacing from the zero-point is unimportant; it has been arbitrarily assumed in the drawing.

The next lower diagram of Fig. 2b illustrates the phase-shift effect of the resonance circuit L1, C1. The values of the inductance and capacitance are so selected that the resonance frequency will lie approximately midway between the frequencies $f2$ and $f3$. At such frequency the phase angle will equal zero between the total voltage $u1$ of the resonance circuit and the current $i1$, while the phase angle $\varphi u2$ between the partial voltage tapped at the capacitor and the alternating current $i1$ will amount to —90°. Above the resonance frequency the phase angle $\varphi u1$ will increase relatively rapidly to a relative value of +90°, while below the resonance frequency it will assume in similar manner negative values to a limit value of —90°. The phase angle $\varphi u2$, on the other hand, remains practically constant at a value of —90°.

The operation of the series resonance circuit L1, C1 is therefore such that the phase differential $\Delta\varphi$, for the frequencies below the resonance frequency, e. g., the frequencies $f1$ and $f2$, nearly equals zero; and for the frequencies above the resonance frequency, e. g., for the frequencies $f3$ and $f4$, it is nearly 180°.

At the output of the modulator GM2, the direct current $ia$ is varied as indicated in Fig. 2c, depending on the phase differential $\Delta\varphi$ of the incoming alternating voltages, and there will therefore result a direct current in positive direction for the relay B at frequencies below the resonance frequency, e. g., at frequencies $f1$ and $f2$, corresponding to the very small phase differential $\Delta\varphi$ of the voltages $u1$ and $u2$, while the frequencies above the resonance frequency, e. g., the frequencies $f3$ and $f4$, will produce for the relay B direct current of corresponding magnitude and negative direction, due to the phase differential $\Delta\varphi$ of nearly 180°.

It will be seen therefore that the signal frequencies $f1$ and $f2$ are in this portion of the circuit, Fig. 2a, treated similarly so far as their effect on the receiver relay B is concerned, and that there is no differentiation between the frequencies $f3$ and $f4$ in the evaluation thereof. As will be apparent, by a comparison with Figs. 1d and 1e, this means that the successive signals in the channel B have been filtered, the frequencies $f1$ and $f2$ corresponding to the space current condition and the frequencies $f3$ and $f4$ to the mark current conditions.

In order to carry out the separation of the space and mark current conditions for the channel A (lower channel in Fig. 2a), care must be taken to bring the phase-shifting for the different signal frequencies in a correspondingly different relationship. The frequencies $f1$ and $f3$ must exercise a certain effect on the receiver element; e. g., a polarized relay A, and the frequencies $f2$ and $f4$ must exercise an opposite effect.

One of the arrangements for bringing this about, of which Fig. 2a shows an example, provides again, as before, a series resonance circuit as a phase-shift element in connection with a phase demodulator and, by a suitable frequency switching at a point ahead of the resonance circuit, takes care of conducting to the resonance circuit, during the space current condition in the signal channel A, a signal frequency which is always below the resonance frequency, while conducting thereto during the mark current condition a signal frequency which lies above the resonance frequency.

The frequency-switching means is, in the embodiment Fig. 2a, a double opposition modulator GM1. This modulator receives, on the one hand, the output voltage from the low-pass filter TP and, on the other hand, the alternating voltage from a frequency generator FG, with a frequency $fm$ which corresponds to the differential of the two outer signal frequencies $f4$—$f1$. In the output circuit of the modulator GM1 is provided a band pass filter BP2 which passes all four frequencies $f1$ to $f4$ and an amplifier V2 serving for the decoupling. In a parallel path is disposed an amplifier, which also serves for decoupling, and a band pass filter BP1 in series therewith. The pass range of the band pass BP1 is limited to the frequencies $f2$ to $f3$. The outputs of the two amplifiers are connected in parallel and form the input for the amplifier V4. The latter corresponds to the previously described amplifier V3 in the upper receiver path. The circuit elements following the output of the amplifier V4 in the lower receiver path also correspond in all details to the elements following the amplifier V3 in the upper path, and a detailed description, outside of identifying these elements, is therefore deemed unnecessary. The series resonance circuit L2, C2 corresponds to the resonance circuit L1, C1; the amplifiers V7 and V8 correspond to the amplifiers V5 and V6; the double opposition modulator GM3 corresponds to a similar modulator shown at GM2; and the relay A corresponds to the relay B. The explanations given with respect to the relationship between the voltages $u1$ and $u2$ relative to the output current $i1$ of the amplifier V3 also apply, so far as the dependency of the phase position of the partial voltages $u3$ and $u4$ is concerned, to the output current $i2$ of the amplifier V4.

The operation of the frequency-switching circuit disposed ahead of the amplifier V4 will now be explained with reference jointly to Figs. 2a and 2b.

The third diagram from the top of Fig. 2b illustrates the effect of the band pass BP1 of Fig. 2a. All frequencies in the shaded range are blocked. Only a small range is effective, which includes the frequencies $f2$ and $f3$, as indicated in the fourth diagram from the top of Fig. 2b. The next lower diagram (fifth from the top of Fig. 2b) indicates the four alternately occurring signal frequencies $f1$ to $f4$ as they are conducted to the modulator GM1. This modulator also receives the frequency $fm$ which is equal to the amount of variation between the outer signal frequencies, i. e., equal to $f4$—$f1$. At the output of the modulator GM1 then appear by known modulation operations the differential frequencies $f1'$ to $f4'$ and the total frequencies $f1''$ to $f4''$, as indicated in the next lower diagram, namely, the sixth diagram from the top of Fig. 2b. The seventh diagram illustrates the pass range of the band pass BP2 which passes only the frequencies from $f1$ to $f4$; i. e., of the frequency bands that had been shifted by modulation, it passes only the frequencies $f4'$ and $f1''$.

Depending on the signal condition of the two channels, there will therefore alternately appear at the input of the amplifier V4 in Fig. 2a only the frequencies $f4'$, $f2$, $f3$ and $f1''$, as indicated in the bottom diagram of Fig. 2b. The value of the frequency $f4'$ is equal to the frequency $f1$, but reflects the signal current condition of the frequency $f4$; and contrariwise, the value of the frequency $f1''$ corresponds to that of $f4$, but reflects the signal current condition of $f1$. Accordingly, the desired frequency exchange or switching has taken place and, specifically, the two outer frequencies have been switched. In this new frequency succession the two lower frequencies $f4'$ and $f2$ correspond to the mark current condition of the channel A, and the two upper signal frequencies $f3$ and $f1''$ correspond to the space current condition of the same channel. See also the diagram, Fig. 1e. The phase-shift and phase modulator in the output of the amplifier V4 therefore has the desired effect, namely, it produces for the relay A a mark current responsive to the occurrence of the signal frequencies $f4'$ or $f2$ and a space current responsive to the occurrence of the signal frequencies $f3$ or $f1''$. It is immaterial that in a certain sense a switching of the space and mark current has taken place, as compared with the operation of the channel B, because a reversal can be obtained at a suitable point by simple reversal of the poles.

The embodiment shown in Fig. 3a corresponds in most respects to that illustrated in Fig. 2a, so that it will not be necessary to repeat the description of certain details. The difference is only in a modified embodiment of the frequency-switching device which will now be explained with reference jointly to Figs. 3a and 3b.

The principal element of the frequency-switching device is an opposition modulator GM1 and a parallel circuit containing the band block BS, which blocks the frequencies $f2$ to $f3$. Of the four frequencies $f1$ to $f4$ occurring alternately at the output of the low-pass filter TP (see diagram at top of Fig. 3b), the band block BS (second diagram from top of Fig. 3b) will therefore suppress the median frequency range so that the input of the amplifier V4 receives only the two outer frequencies $f1$ and $f4$, as indicated in the third diagram from the top of Fig. 3b.

At the input of the modulator GM1 is, however, a band pass BP1 which passes only the range comprising the frequencies $f2$ and $f3$ (fourth diagram from the top of Fig. 3b). The modulator GM1 also receives the auxiliary frequency $fm$ produced by the generator FG which is equal to the amount of frequency variation between the frequencies $f2$ and $f3$, i. e., equal to the simple amount of frequency variation (fifth diagram from the top of Fig. 3b). The output product of the modulator therefore will be two differential frequencies $f2'$ and $f3'$, as well as two frequency sums $f2''$ and $f3''$, that is, a total of four new signal frequencies. The positions of these frequencies agree with those of the original signal frequencies, as indicated in the sixth diagram from the top of Fig. 3b.

The two outer frequencies $f2'$ and $f3''$ are suppressed by the band pass BP2 having a filter curve corresponding to that of BP1 of Fig. 2a, and at the input of the amplifier V4 will therefore alternately appear the four frequencies indicated in the bottom diagram of Fig. 3b. The input to the amplifier V4 may be, e. g., over a fork circuit W (Fig. 3a) coacting with a repeater N which may, with practically similar effect, be used in place of the amplifiers V1 and V2 of Fig. 2a, having simply the purpose of decoupling the two circuits which are to be joined at the corresponding point.

It will be seen at once, by a comparison with Fig. 1e, that the two lower frequencies $f1$ and $f3'$ (bottom diagram of Fig. 3b) correspond to the space current condition of the signal channel A, while the two upper frequencies $f2''$ and $f4$ correspond to the mark current conditions of the same channel. The requirements which must be fulfilled by the phase-shifting and phase demodulation following the amplifier V4 are identical to those of the corresponding equipment for the channel B.

Another embodiment of the frequency-switching will now be described with reference to Figs. 4a and 4b. The phase-shifting and demodulation means at the output of the amplifiers V3 and V4 may correspond to those of Figs. 3a and 3b and therefore have not been shown in detail, but merely indicated by the symbols U1 and U2. The frequency-switching device comprises again a double opposition modulator GM1 with a serially related decoupling amplifier V2 and a parallel circuit from which filters are omitted, containing for decoupling purposes only the amplifier V1.

The modulator GM1 receives the four alternately occurring signal frequencies $f1$ to $f4$ and also an auxiliary frequency $fm$ produced by the generator FG. This auxiliary frequency is equal to double the amount of frequency variation, i. e., equal to $f3-f2$, as indicated at the top of Fig. 4b. As a modulation product, there will appear the frequencies indicated in the second diagram from the top of Fig. 4b, namely, the differential frequencies $f1'$ to $f4'$ and the sums of the frequencies $f1''$ to $f4''$. Between the outputs of the decoupling amplifiers V1 and V2 and the inputs of the amplifiers V4 is a band pass BP adapted for a pass range embracing the frequencies $f2$ and $f3$, as indicated in the third diagram from the top of Fig. 4b. It follows therefore that only the frequencies $f2$ or $f3$ or the frequencies $f4'$ or $f1''$ of equal values can appear at the input of the amplifier V4. The frequencies $f2$ and $f4'$ correspond to the mark current conditions of the channel A, and the frequencies $f3$ and $f1''$ to the space current conditions of the same channel. See also Fig. 1e.

The converter U2, which follows the amplifier V4, consists, as mentioned, of phase-shift and demodulation means and converts the lower frequencies $f2$ and $f4'$ into direct current corresponding to mark current conditions, while converting the upper frequencies $f3$ and $f1''$ into direct current corresponding to the space current conditions. These currents are effective to operate the relay A.

The pass curve of the band pass BP may also be so selected that it embraces, instead of the two median frequencies, either only the two lower signal frequencies $f1$ and $f2$ or only the two upper signal frequencies $f3$ and $f4$. The effect will be the same, if care is taken by corresponding alteration of the resonance position of the phase-shift in the converter U2 to cause the demodulator to discriminate between the lower and upper frequencies of the frequency pair. The converter U2 will then merely differ from the converter U1 by a different resonance position of its phase-shift element.

A further simplification results from the circuit shown in Fig. 5a, which will now be described by joint reference to Fig. 5b. There is in this case for the frequency-switching merely a double opposition modulator GM1, without any parallel circuit, thereby also eliminating the decoupling means in the input of the amplifier V4.

The modulator GM1 receives the four alternately occurring signal frequencies $f1$ to $f4$ and an auxiliary frequency $fm$ produced by the generator FG. See also the top diagram in Fig. 5b. The auxiliary frequency $fm$ corresponds in value to a simple amount of frequency variation, e. g., to the differential $f3-f2$. In the output circuit of the double opposition modulator then appear again the corresponding differential frequencies $f1'$ to $f4'$ and the frequency sums $f1''$ to $f4''$. Two pairs of these frequencies coincide in accordance with the value of the auxiliary frequency $fm$. The value of $f3'$ is equal to $f1''$, and $f4'$ is equal to $f2''$, as indicated in the second diagram from the top of Fig. 5b.

The output of the modulator GM1 feeds to a band pass BP which suppresses all frequencies except the median frequencies $f2$ and $f3$. Accordingly, as indicated in the bottom diagram of Fig. 5b, there will alternately appear at the input of the amplifier V4 only the frequencies $f3'$, $f1''$ or $f4'$ and $f2''$. The first noted frequencies correspond to the space current conditions, and the latter to the mark current conditions of the signal channel A. The desired conversion is obtained, as before, in a converter U2 which receives the signal frequencies from the amplifier V4.

Fig. 6a shows an embodiment of the invention in which the filtering of the individual signal frequencies, which is required for the separation of the signals, is accomplished in the two receiver paths purely by differentiating phase-shift and without any frequency-shifting or frequency-switching. The receiver path assigned to the signal channel B is formed by elements corresponding to those in previously described embodiments. The phase shift element is a series resonance circuit comprising an inductance L and a capacitance C just like in the resonance circuit L1, C1 of Fig. 2a. The resonance circuit receives the output current $i1$ from the amplifier V1 which in turn is connected to the output of the low-pass filter TP. The partial voltages $u1$ and $u2$ are amplified in amplifiers V3 and V4 and are conducted to the double opposition modulator GM1 which feeds direct current signals to the control relay B for the signal channel B.

The other receiver path begins with the amplifier V2, having its output connected to two phase-shift elements PD1 and PD2. These elements are respectively connected to the amplifiers V5 and V6. The output circuits of these two amplifiers are connected with the double opposition modulator GM2, the direct current output of which is used for controlling the relay A.

The phase-shift elements PD1 and PD2 are constructed so that the phase position of their output voltages $u3$ and $u4$ has, relative to the frequency, the form illustrated in the lower part of Fig. 6b. While the phase angle of the voltage $u4$ rises only slightly with increasing frequency, the phase angle of the voltage $u3$ will with increasing frequency rise much more in such a manner that the phase differentials of the two alternating voltages $u3$ and $u4$ increase within the range of the four alternately occurring signal frequencies $f1$ to $f4$ from frequency to frequency by 180°. The intersecting point of the two phase angle curves for the voltages $u3$ and $u4$ may be as shown in Fig. 6b at the frequency $f1$, but may likewise be at any other of the remaining frequencies. However, care must be taken that the phase angle differential is with each of the four signal frequencies an even multiple of 180° and that it differs from the neighboring signal frequency always by 180°.

With such a form of the phase position relative to the frequency, there will result for the successive signal frequencies in the input of the modulator GM2 currents of alternately different direction with characteristics as shown in Fig. 2c; i. e., at the signal frequencies $f1$ and $f3$ there will appear at the output of the modulator GM2 direct current of definite, e. g., of positive, direction, while currents of opposite direction, e. g., negative direction, will appear at the other signal frequencies $f2$ and $f4$. This results in the separation of the space and mark current conditions for the relay A of the signal channel A.

It will be realized from Fig. 6a that there are no filters, but only phase-shift elements required for the conversion of the signal frequencies and the separation of the signal channels.

We claim:

1. The method of selectively receiving two signals which are formed by alternate space and mark current conditions and are by frequency-keying transmitted in superposed form resulting in four alternately occurring signal frequencies which are transformed in the receiver into a low-frequency range for evaluation in two associated receiver paths comprising the following steps, namely, (1) filtering said four signal frequencies by a frequency-depending phase-shift and phase demodulation to form different frequency pairs for the two respective receiver paths; and (2) converting the resulting frequencies in each path into direct current signals corresponding to mark and space current conditions of each associated signal channel.

2. Apparatus for selectively receiving two signals which are formed by alternate space and mark current conditions and are by frequency-keying transmitted in superposed form resulting in four alternately occurring signal frequencies which are received in a receiver having two receiver paths, one for each signal channel, comprising frequency-depending phase-shift means and frequency demodulation means for filtering from said four alternately occurring signal frequencies two distinct frequency pairs, one for each signal channel, and means for converting the frequencies of each pair of frequencies in each path to produce direct current signals corresponding to mark and space current conditions for the respective signal channels.

3. The apparatus defined in claim 2, wherein phase-shift and phase demodulation elements are disposed in at least one of said receiver paths for converting each frequency of the pair of higher signal frequencies into direct current signals corresponding to one signal current condition of the associated signal channel and for converting each frequency of the pair of lower frequencies into direct current signals corresponding to another signal current condition of the identical signal channel.

4. The apparatus defined in claim 2, wherein said phase shift means is effective to produce for two predetermined of said four signal frequencies substantially coinciding phase positions and for the two remaining frequencies substantially opposite phase positions, and circuit means for feeding the resulting alternating voltages to said phase demodulation means.

5. The apparatus defined in claim 2, wherein a set of phase-shift and phase demodulation elements is disposed in each of said receiver paths, a frequency-switching device cooperating with the set of phase-shift and phase demodulation elements in one of said paths, said switching device being effective to switch the relative positions of two predetermined of said signal frequencies, and the phase-shift and phase demodulation elements being effective in the associated receiver path to convert each of a predetermined pair of said four signal frequencies into direct current signals corresponding to one signal current condition of the associated signal channel.

6. The apparatus defined in claim 2, comprising a set of elements in one of said receiver paths for converting each of two predetermined of said four signal frequencies into direct current signals corresponding to the signal current condition of the associated signal channel, a frequency-switching device in the other receiver path for interchanging the relative positions of two predetermined of said four signal frequencies, and means for feeding said interchanged frequencies to a set of elements in said other receiver path for converting such frequencies into direct current signals corresponding to signal current conditions of the associated signal channel.

7. The apparatus defined in claim 2, comprising a set of elements in one of said receiver paths for converting each of two predetermined of said four signal frequencies into direct current signals corresponding to the signal current condition of the associated signal channel, a frequency-switching device in the other receiver path for interchanging the relative positions of two predetermined of said four signal frequencies, means for feeding said interchanged frequencies to a set of elements in said other receiver path for converting such frequencies into direct current signals corresponding to signal current conditions of the associated signal channel, said frequency-switching device comprising a modulator for receiving said four signal frequencies, means for conducting to said modulator an auxiliary frequency, said auxiliary frequency corresponding to the amount of frequency variation between the two outer of said signal frequencies, said modulator being effective to shift the frequency band of said four alternately occurring signal frequencies, filter means adapted to pass only the frequency band of said four signal frequencies, and a circuit disposed in parallel with said modulator which passes only the two median frequencies of said four signal frequencies.

8. The apparatus defined in claim 2, comprising a set of elements in one of said receiver paths for converting each of two predetermined of said four signal frequencies into direct current signals corresponding to the signal current condition of the associated signal channel, a frequency-switching device in the other receiver path for interchanging the relative position of two predetermined of said four signal frequencies, means for feeding said interchanged frequencies to a set of elements in said other receiver path for converting such frequencies into direct current signals corresponding to signal current conditions of the associated signal channel, said frequency-switching device comprising means for filtering from said four signal frequencies the two median frequencies, a modulator for receiving said median frequencies, an auxiliary frequency fed to said modulator which corresponds to the amount of frequency variation between said filtered frequencies, whereby said filtered frequencies are modulated, a filter for passing only the frequency band of said median signal frequencies, and a circuit disposed in parallel with said modulator for blocking only said two median signal frequencies.

9. The apparatus defined in claim 2, comprising a set of elements in one of said receiver paths for converting each of two predetermined of said four signal frequencies into direct current signals corresponding to the signal current condition of the associated signal channel, a frequency-switching device in the other receiver path for interchanging the relative positions of two predetermined of said four signal frequencies, means for feeding said interchanged frequencies to a set of elements in said other receiver path for converting such frequencies into direct current signals coresponding to signal current conditions of the associated signal channel, said frequency-switching device comprising a modulator for displacing the frequency band of the four alternately occurring signal frequencies by modulation with an auxiliary frequency which corresponds to twice the amount of frequency variation of two adjacent of said signal frequencies, a circuit connected in parallel with said modulator which passes all of said four signal frequencies, a filter disposed in a common output circuit which passes only two adjacent of signal frequencies, and means for conducting to said filter the frequency bands displaced by said modulator and also the frequencies from said parallel circuit.

10. The apparatus defined in claim 2, comprising a set of elements in one of said receiver paths for converting each of two predetermined of said four signal frequencies into direct current signals corresponding to the signal current condition of the associated signal channel, a frequency-switching device in the other receiver path for interchanging the relative positions of two predetermined of said four signal frequencies, means for feeding said interchanged frequencies to a set of elements in said other receiver path for converting such frequencies into direct current signals corresponding to signal current conditions of the associated signal channel, said frequency switching device comprising a modulator for displacing the frequency band of the four alternately occurring signal frequencies by modulation with an auxiliary frequency which corresponds to the amount of frequency variation between two neighboring frequencies, and filter means in series with said modulator which passes only the two median of said signal frequencies.

11. The apparatus defined in claim 2, comprising a set of elements in one of said receiver paths for converting each of two predetermined of said four signal frequencies into direct current signals corresponding to the signal current condition of the associated signal channel, and means for conducting said four signal frequencies to a phase demodulator over phase-shift elements in the other receiver paths, said phase-shift elements being constructed so as to produce a phase angle differential of the two input voltages at the demodulator which amounts for each of the four signal frequencies to an even multiple of 180° and which differs from the neighboring frequency by 180°.

References Cited in the file of this patent

UNITED STATES PATENTS

| Number | Name | Date |
|---|---|---|
| 2,301,373 | Cox | Nov. 10, 1942 |
| 2,464,837 | Werthmann et al. | Mar. 22, 1949 |
| 2,495,705 | Devaux | Jan. 31, 1950 |
| 2,513,910 | Bliss | July 4, 1950 |
| 2,650,266 | Browning | Aug. 25, 1953 |